(12) United States Patent
Reiche

(10) Patent No.: US 8,985,300 B2
(45) Date of Patent: Mar. 24, 2015

(54) CONTROL SYSTEM OF A TRAVELING MULTI-SEGMENT CONVEYOR BRIDGE

(75) Inventor: Wolfgang Reiche, Leipzig (DE)

(73) Assignee: TAKRAF GmbH, Leipzig (DE)

( * ) Notice: Subject to any disclaimer, the term of this patent is extended or adjusted under 35 U.S.C. 154(b) by 893 days.

(21) Appl. No.: 13/026,836

(22) Filed: Feb. 14, 2011

(65) Prior Publication Data

US 2011/0198193 A1      Aug. 18, 2011

(30) Foreign Application Priority Data

Feb. 15, 2010    (DE) .......................... 10 2010 007 997

(51) Int. Cl.
| | | |
|---|---|---|
| B65G 43/00 | (2006.01) | |
| B65G 43/10 | (2006.01) | |
| E21F 13/08 | (2006.01) | |
| B65G 41/00 | (2006.01) | |

(52) U.S. Cl.
CPC .............. *B65G 43/10* (2013.01); *B65G 41/008* (2013.01); *B65G 41/002* (2013.01); *E21F 13/08* (2013.01)
USPC .......................................... 198/301; 198/303

(58) Field of Classification Search
USPC ............................ 198/300–320; 239/730–733
See application file for complete search history.

(56) References Cited

U.S. PATENT DOCUMENTS

| | | | | |
|---|---|---|---|---|
| 3,361,248 A | * | 1/1968 | Daymon ......................... | 198/303 |
| 3,625,339 A | * | 12/1971 | Smith ............................ | 198/301 |
| 3,807,436 A | * | 4/1974 | Pringle .......................... | 239/731 |
| 3,823,730 A | * | 7/1974 | Sandstrom et al. ........... | 239/731 |
| 3,974,845 A | * | 8/1976 | Indresaeter .................... | 239/731 |
| 4,073,309 A | * | 2/1978 | Fraser et al. .................. | 239/731 |
| 4,099,669 A | * | 7/1978 | Cortopassi ........................ | 239/1 |

(Continued)

FOREIGN PATENT DOCUMENTS

| | | |
|---|---|---|
| DE | 1 262 945 | 3/1968 |
| DE | 102004040394 A1 | 3/2006 |

(Continued)

OTHER PUBLICATIONS

Braunkohle—Surface-Mining, vol. 48 (1996), No. 4, Jul./Aug., pp. 413 to 421 under the title SATAMA—Automated Opencast Site Measuring by Means of High-Precision Real-Time GPS Measurements on Bucket Wheel Excavators. Trans Tech publishers, Zurich-Uetikon, Switzerland.

(Continued)

*Primary Examiner* — William R Harp
(74) *Attorney, Agent, or Firm* — McGlew and Tuttle, P.C.

(57) ABSTRACT

A control system is provided for a conveyor bridge with a plurality of segments and equipped with individual traveling gears for the cyclic traveling (moving) on a surface in travel straight ahead and in a curve. The control system follows a process including the steps of: detecting positions of both ends of the segments of a conveyor bridge on terrain; calculating target coordinates for the control of the conveyor bridge; simultaneous switching on of the drives of all traveling gears; synchronously controlling the drives of all traveling gears; during the travel movement, constantly measuring the distance covered by each traveling gear; constantly measuring angular deviations from the straight line between two adjacent segments during the travel movement; providing a lateral slope compensation between the traveling gear and the support frame of each segment; and providing a fine alignment of all segments after reaching the target coordinates.

12 Claims, 5 Drawing Sheets

(56) References Cited

U.S. PATENT DOCUMENTS

| | | | |
|---|---|---|---|
| 4,190,068 A * | 2/1980 | Beusch et al. | 137/1 |
| 4,206,840 A * | 6/1980 | Hanson | 198/301 |
| 4,340,183 A * | 7/1982 | Kegel et al. | 239/729 |
| 4,423,839 A * | 1/1984 | McConnell | 239/1 |
| 5,185,935 A | 2/1993 | McMillion et al. | |
| 5,230,587 A * | 7/1993 | Pensoneau | 405/129.6 |
| 5,749,452 A * | 5/1998 | Kanenwischer | 198/301 |
| 6,155,400 A | 12/2000 | Daigh et al. | |
| 6,254,018 B1 * | 7/2001 | Ostrom | 239/731 |
| 6,290,151 B1 * | 9/2001 | Barker et al. | 239/729 |
| 6,336,545 B1 * | 1/2002 | Arndt et al. | 198/303 |
| 6,512,992 B1 * | 1/2003 | Fowler et al. | 702/150 |
| 6,928,339 B2 * | 8/2005 | Barker | 700/284 |
| 7,076,346 B2 * | 7/2006 | Sturges et al. | 701/23 |
| 7,191,888 B2 * | 3/2007 | Kahrger et al. | 198/303 |
| 7,384,008 B1 * | 6/2008 | Malsam | 239/731 |
| 7,555,799 B2 * | 7/2009 | Petermann et al. | 14/2.5 |
| 7,647,664 B2 * | 1/2010 | Petermann et al. | 14/77.1 |
| 7,814,599 B2 * | 10/2010 | Brewka | 14/2.4 |
| 8,276,736 B2 * | 10/2012 | Steele | 198/303 |
| 8,376,125 B2 * | 2/2013 | Boyce et al. | 198/617 |
| 2007/0267524 A1 * | 11/2007 | Mack | 239/729 |
| 2009/0071796 A1 | 3/2009 | Petermann et al. | |

FOREIGN PATENT DOCUMENTS

| | | |
|---|---|---|
| DE | 10 2005 010465 A1 | 9/2006 |
| WO | 2008/067802 A1 | 6/2008 |

OTHER PUBLICATIONS

Braunkohle—Surface-Mining, vol. 52 (2000), No. 5, September / October, pp. 469 to 479 under the title, "GPS—State of the Art and Its Applications in the Mining Industry." Germany.

* cited by examiner

CONTROL SYSTEM OF A TRAVELING MULTI-SEGMENT CONVEYOR BRIDGE

CROSS REFERENCE TO RELATED APPLICATIONS

This application claims the benefit of priority under 35 U.S.C. §119 of German Patent Application DE 10 2010 007 997.9 filed Feb. 15, 2010, the entire contents of which are incorporated herein by reference.

FIELD OF THE INVENTION

The present invention pertains to a control system for the control of a conveyor bridge comprising a plurality of segments and equipped with individual traveling gears for the cyclic traveling (moving) on a surface when traveling straight and in a curve for a process and a device, wherein the segments shall together always form an almost linear conveying path when viewed from the top. The conveyor bridge is equipped with a continuous conveyor belt running over all segments. The segments are connected to one another and are supported, for example, starting from one of the middle segments and then on both sides in the outwards direction on the segment arranged next to it. When such a conveyor bridge is moved on an uneven terrain, the individual segments must cover different distances in order to reach a common target line from a common starting line. In this case, constant corrections of the positions of the segments in relation to one another are necessary during the moving process. Because of the large dimensions of such a conveyor bridge, attention must also be paid to the fact that the segments also always assume a vertical (upright) position in case of uneven subsoil/track, since otherwise their stability is not guaranteed.

BACKGROUND OF THE INVENTION

A conveyor comprising a plurality of segments, which is provided with a means, which indicates a possible deviation of the segments from the straight line after the moving back of the conveyor together with progressive reduction in mining, is known from the patent DE 1 262 945. This means consists of a tensioned wire cable, which is functionally connected to measuring points arranged at the segments and these measuring points indicate to a monitoring person the extent of the deviations from the straight line. This measurement may then bring about a correction of the position of the respective segment, so that all segments are in a line with the necessary accuracy at the end of the alignment process.

Furthermore, a conveyor bridge traveling on crawler traveling gears (continuous track or crawler track vehicle propulsion), which comprises a plurality of segments, is known from the U.S. Pat. No. 6,155,400. It is equipped with a conveyor belt that is guided over the entire length of the conveyor bridge. The individual segments are connected to one another in an articulated manner and will travel by a certain extent simultaneously during a moving process. The moving takes place with untensioned conveyor belt. When traveling in a straight line and in curves, it is not possible, in spite of a synchronous control of the drives for the crawler traveling gears on an uneven subsoil, to achieve that all segments move in a line jointly during the moving process. In order not to permit excessively great deviations from the ideal line between the individual segments, the angle deviations from one another are measured by sensors. If a maximum preset deviation is exceeded, the drives are so affected that a correction of their positions in relation to one another is brought about by reducing the speed or by stopping the hurrying ahead section and/or an acceleration of the speed or a moving on of the section that has remained behind. After reaching the end positions of the two outer sections, a fine alignment of the inner sections is made. Then follows a tensioning of the conveyor belt. After that, the conveyor bridge can be operated again. This solution is not suitable for a pivoting of the entire conveyor bridge by 180°, since the differentiated control of the two outer sections necessary for this is not guaranteed.

It is known from a plurality of literature sources to use the Global Positioning System (GPS) in opencast mining to determine the positions of large apparatuses. Thus, e.g., in the technical journal BRAUNKOHLE—Surface-Mining, vol. 48 (1996), No. 4, July/August, pages 413 to 421 under the title "SATAMA—Automated Opencast Site Measuring by Means of High-Precision Real-Time GPS Measurements on Bucket Wheel Excavators," it is disclosed how the excavated masses can be determined by the progression of mining by an extraction apparatus on opencast mining terrain. Moreover, the Global Positioning System (GPS) is in the meantime used aside from pure survey use in opencast mining in the operating technique there as well. The applications extend from automatic documentation of the respective positions of the apparatuses, monitoring and disposition of their movements up to support of the control tasks of these apparatuses. An overall view is given in the same technical journal BRAUNKOHLE—Surface-Mining, vol. 52 (2000), No. 5, September/October, pages 469 to 479 under the title, "GPS—State of the Art and Its Applications in the Mining Industry."

In the patent DE 10 2004 040 394 A1, the application of the Global Positioning System (GPS) in a generalized manner is provided for the control of a conveyor bridge comprising a plurality of segments for the control of the two outer segments, wherein the traveling gear of one segment is the master traveling gear and the traveling gear of the other segment is the slave traveling gear, which follows the segment with the master traveling gear. The segments arranged between them are moved approximately at the same speed. Due to unevennesses of the subsoil and other external effects, the individual segments do not form a straight line in their entire line direction in relation to one another during the moving process. This joint moving back proves to be even more difficult when the entire conveyor bridge shall be moved in a curved path. The necessary correction of all segments in relation to one another is only performed when the end positions were reached with the two outer segments.

SUMMARY OF THE INVENTION

The basic object of the present invention is to develop a concept for the joint control of a conveyor bridge comprising at least three segments, in which the entire conveyor bridge with its segments can be moved from a linear starting position into a linear end position and none of the segments performs a deviation exceeding a certain extent from the straight line during the traveling/moving process.

This object is accomplished by means of a control, in which at first the positions of the two outer segments of the conveyor bridge comprising a plurality of segments and equipped with driven traveling gears by means of the Global Positioning System (GPS) and then positions of the individual segments in relation to one another are cyclically detected and an influence on the traveling gears of the segments is provided when an upper limit and a lower limit are exceeded for bringing about an aligned position of the segments of the conveyor bridge until reaching the desired position. For applying the process described below, data about the respective positions of the segments of the conveyor bridge are fed to a control system, processed in the control system, and commands are given to the drives of the traveling gears of the segments for the control of the travel movement of the conveyor bridge into an end position. The process used for this takes place in the following steps:

The conveyor bridge is located in the starting position. The segments are aligned with their conveying sections in a straight line as viewed from the top. Starting from there, only the positions of both ends of the conveyor bridge need to be detected for detection of the starting position of the conveyor bridge before the moving process on terrain. This is performed by using the Global Positioning System (GPS).

The target coordinates, which are preset by a program or manually, for the control of the conveyor bridge in the intended moving sequence for each traveling gear of the segments of the conveyor bridge are then calculated as a traveling gear-specific number of pulses (also rotor rotations) in the end position.

For the start of the movement of the conveyor bridge, the drives of all traveling gears of the segments of the conveyor bridge are switched on at the same time.

During the movement, the drives of all crawler traveling gears are controlled with the same preset set point.

During the forwards movement, the pulses that correspond to the path and the angle deviations from the straight line as viewed from the top between two adjacent segments during the travel movement are measured constantly. With the measuring of the path pulses, it is achieved that all crawler traveling gears cover the same path, on even terrain this means that the conveyor bridge reaches the goal in a completely aligned manner. The angles that form the longitudinal axes of the segments are additionally measured. As a result, the exact extent of the forwards and backwards running of the respective segment can be calculated. If the limit values of a defined window of the angles are exceeded (deviation of) 180°, the travel speed of the crawler traveling gear in question is increased, reduced or maintained and/or the travel of the other crawler traveling gears is slowed down or interrupted. This correcting movement takes place until the preset lower limit value has been reached.

To guarantee in each case a vertical position of all segments in relation to the travel level, a lateral slope compensation is provided between the traveling gear and the support frame of each segment. Such a lateral slope compensation is known from the state of the art and therefore does not need to be described in detail at this point.

After the two outer segments of the conveyor bridge, with the reaching of the target coordinates, have assumed the end position of the movement back, a fine alignment of the inner segments takes place as needed.

The conveying is maintained during this movement back.

In traveling straight ahead, all crawler traveling gears operate with the same preset set point (if the above-described adjustments do not take effect). In travel in a curve, because of the different paths determined by the control system for the individual traveling gears, the drives are controlled such that the segments of the conveyor bridge form a straight line at any time.

Due to the detection of the angle differences between two adjacent segments on both sides of the articulated connection, a constant control of both measurement results is made possible by means of constant comparison. Both measurement results must be identical or almost identical. In case of deviations exceeding a defined value, a signal is provided to indicate that one of the two measuring means is not operating with sufficient accuracy.

If one of the two measuring means fails, the other one can be used alone for the measured value detection only until the repair thereof.

The device for applying the above-disclosed process comprises a control system for detecting and processing measured values and targeted control of the drives of the traveling gears of the segments, a detection, analysis and control program for the control system, a means for detecting the positions of the two outer sections by means of using the Global Positioning System (GPS), incremental transducers for each drive of a traveling gear for determining the path covered in each case, in each case a distance measuring means between two adjacent segments for determining a deviation (angle difference) from the straight line exceeding a certain limit, and a lateral slope compensation by means of adjusting elements arranged between the traveling gears and the support frames of the segments.

The conveying operation can be maintained during the moving forward of the conveying path. Since only small differences have to be compensated during the possible correction of individual crawler traveling gears, this takes place in the time, in which the dump car stays in the end position anyway in order to fill up the dumping edge. The continuous conveying of material is not compromised by the moving process.

Further advantages of the present invention are explained based on the following description and the associated drawings, in which a preferred exemplary embodiment is shown. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
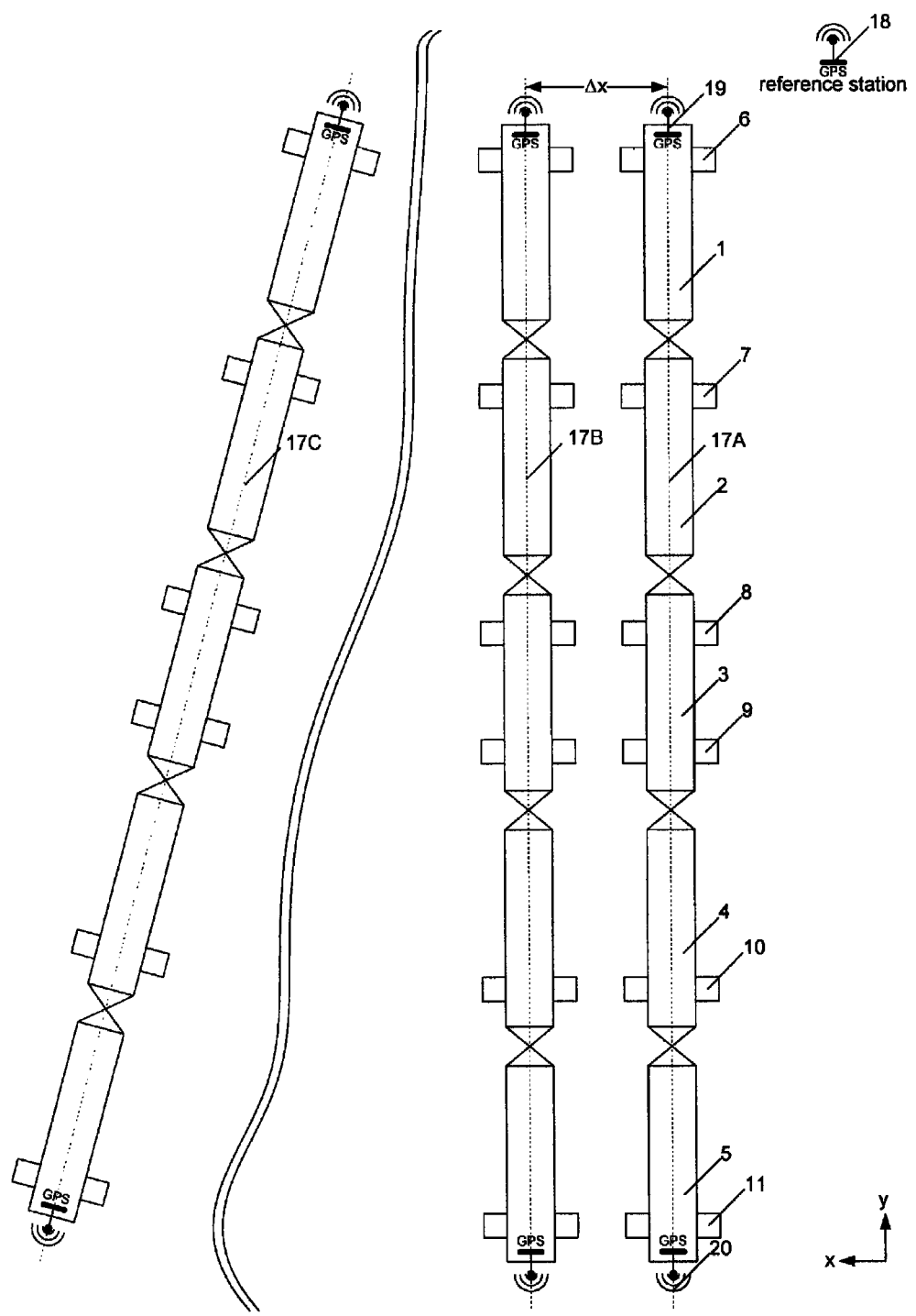
FIG. 1 is a top view of a conveyor bridge comprising five segments.
Figure 2:
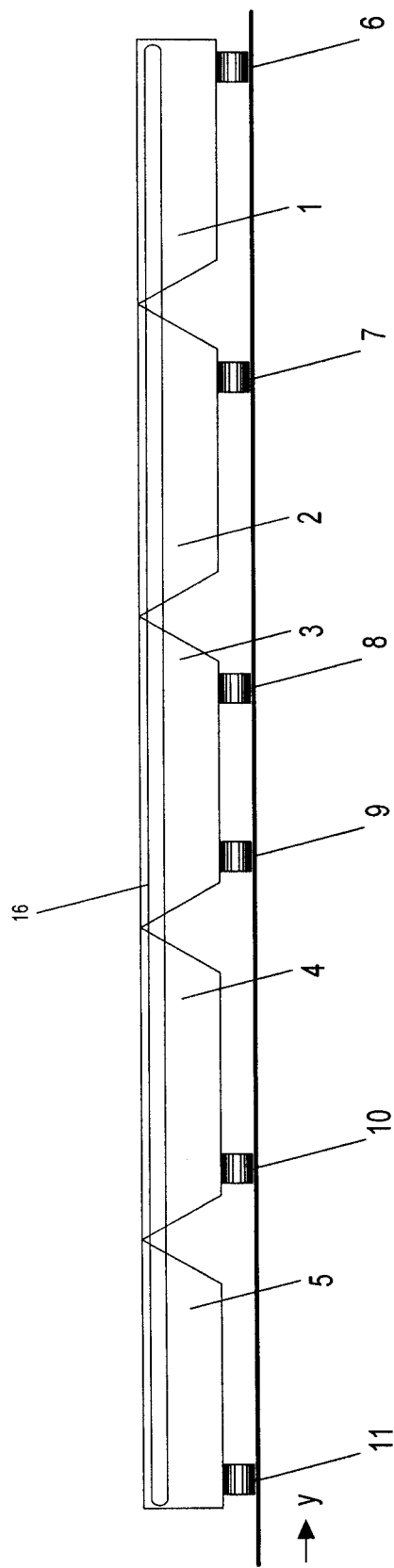
FIG. 2 is a lateral view of the conveyor bridge according to FIG. 1.

Referring to the drawings in particular, According to FIGS. 1 and 2, the conveyor bridge comprises the segments 1 through 5. They are equipped with crawler traveling gears 6 through 11. Instead of the crawler traveling gears 6 through 11, traveling gears with wheels may also be used. The actual selection always depends on the respective special field of application. The middle segment 3 is in this example equipped with two crawler traveling gears 8, 9, and all other segments 1, 2, 4 and 5 are each equipped with a traveling gear 6, 7, 10, 11. The segments 2 and 4 lying on both sides of the middle segment 3 are supported on the segment 3. Segment 1 is in turn supported on segment 2, and segment 5 on segment 4. Each of these supports take place in cross joints, wherein the one joint in the ideal starting position has a horizontal pivot axis and the other joint has a vertical pivot axis. Segments 1, 3 and 5 are equipped with a means for lateral slope compensation. As a result, it shall be achieved that unevennesses present in the direction of travel of segments 1 through 5 under the crawler traveling gears 6 through 11 can be compensated. Consequently, all segments 1 through 5 also remain in the vertical position even when traveling through such unevennesses. Such means are generally well known and therefore do not need to be described in detail. Assuming that it is essential in terms of the present invention to achieve a linear alignment of the conveyor bridge comprising of a plurality of segments 1 through 5 and equipped with individual traveling gears 6 through 11 at the level of the carrying run of the conveyor belt 16, then it is important from the viewpoint of the dynamics of the conveyed goods flow that the support roller, arranged below in the center, of a troughed support roller station, assumes a horizontal position. Otherwise, the conveyor belt 16 would run off center.

Figure 3:
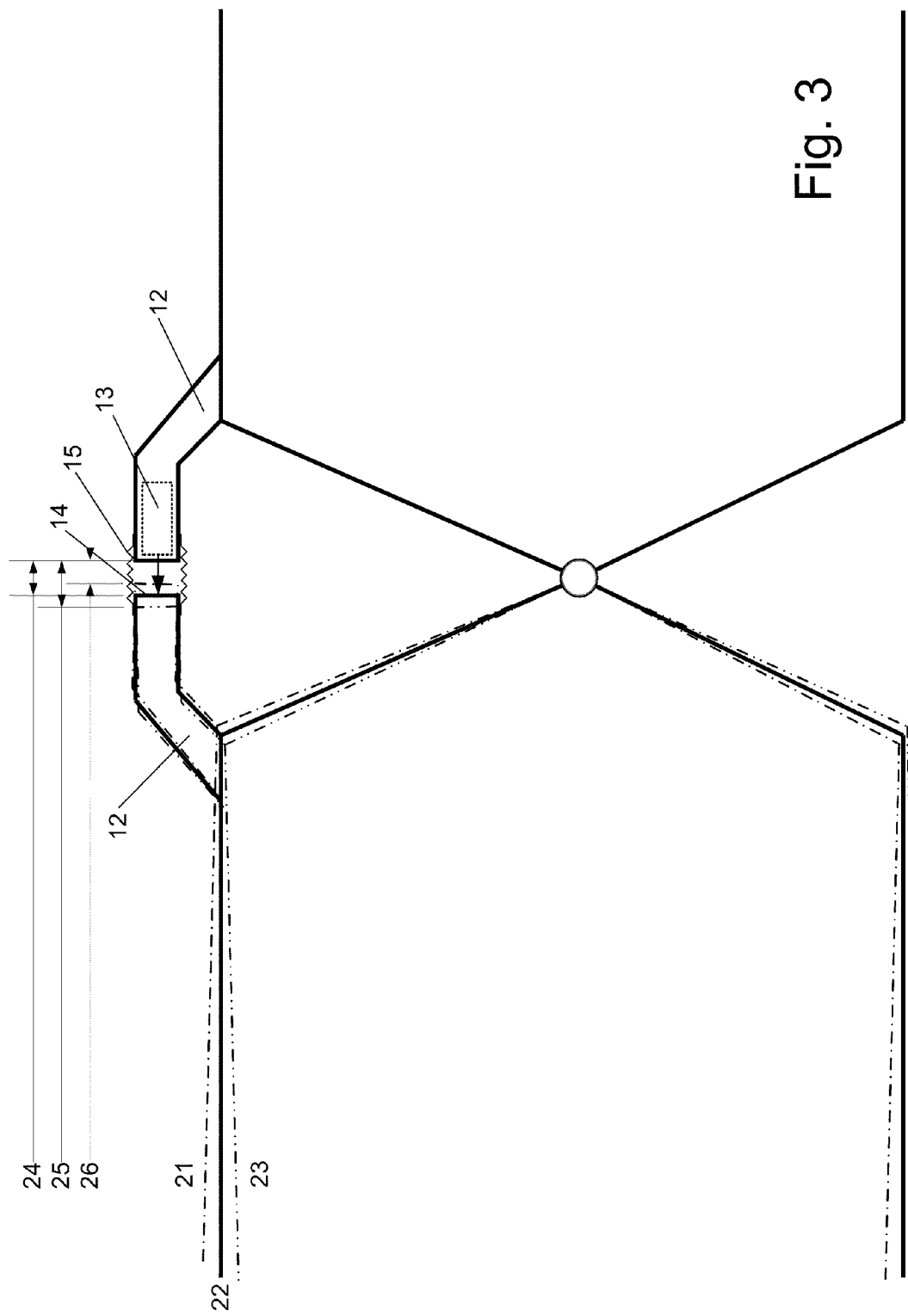
FIG. 3 is the arrangement of a measuring instrument for detecting the position of two segments arranged next to one another in relation to one another.

The arrangement of a range measuring instrument for the contactless measurement of distance by means of laser for detecting the positions of two segments arranged next to one another in relation to one another as viewed from the top is shown in the drawing according to FIG. 3. On one side a laser sensor 13 and on the other side a reflector 14 are arranged at the support frames 12 of two segments located next to one another, such as, for example, segments 1 and 2. With this measuring instrument, the positions of the two segments 1 and 2 in relation to one another are determined by the change in the distances between laser sensor 13 and reflector 14. In the drawing, the central position of laser sensor 13 and reflector 14 is the ideal position, in which both segments 1 and 2 are located on a straight line in relation to one another as viewed from the top. The arrangements with the largest 25 and the smallest 26 distance from laser sensor 13 and reflector 14 represent the maximum permissible deviations in each case into one of the two possible directions.

To prevent the effects of dust and the sun, the measuring path is encapsulated by means of a stretchable rubber sleeve 15.

The laser sensors 13 and reflectors 14 are mounted on both sides of the segment connections, so that the sensors mutually monitor one another and in case of failure of a laser sensor 13, can be switched over to the remaining one until the repair of same.

Figure 4:
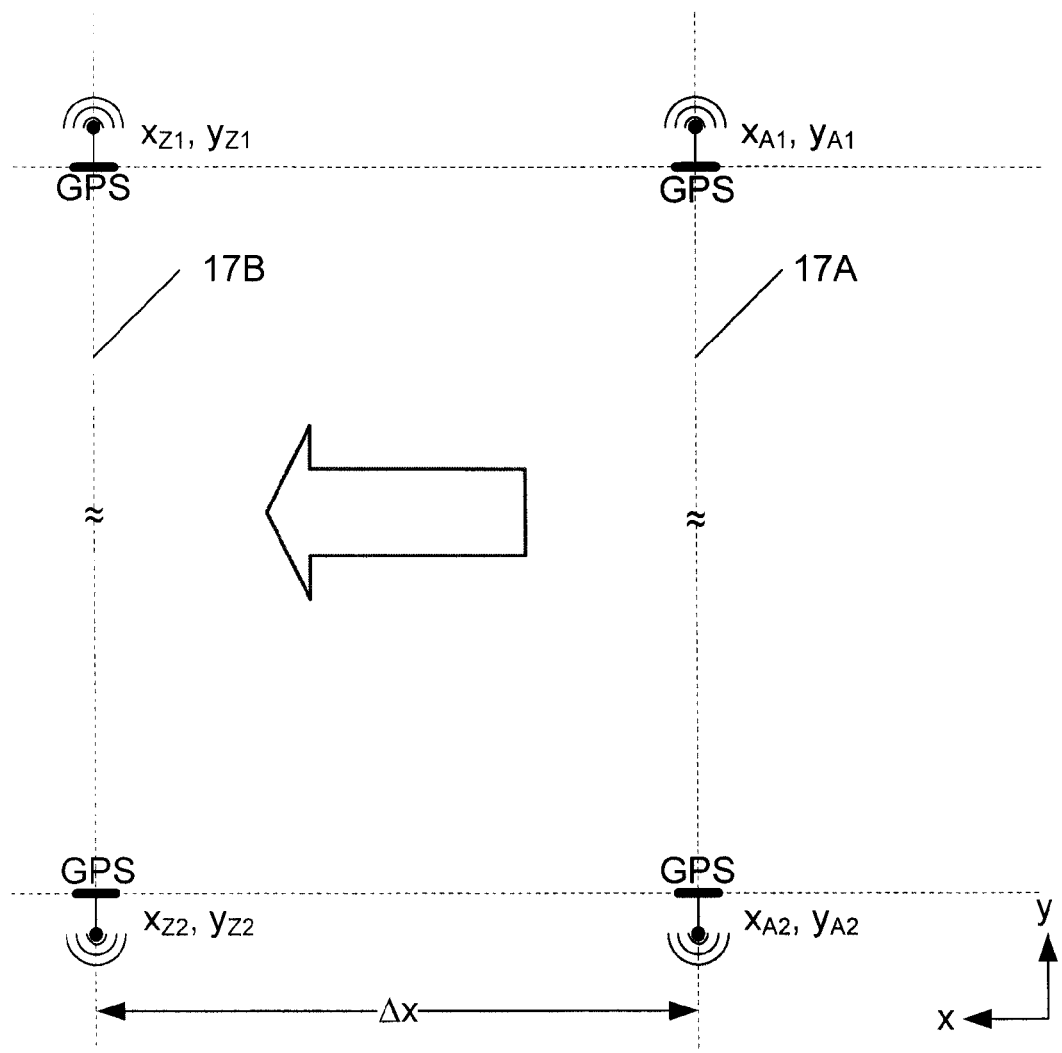
FIG. 4 is the starting position, shown as a system of coordinates, and end position of a conveyor bridge.

When a conveyor bridge comprising segments 1 through 5 and aligned with its conveyor belt 16 in a line shall travel/be moved from a starting line 17A with the coordinates $x_{A1}; y_{A1}$ and $x_{A2}; y_{A2}$ by a certain return extent to a target line 17B with the coordinates $x_{Z1}; y_{Z2}$ and $x_{Z2}; y_{Z2}$, this is detected as a system of coordinates according to FIG. 4. If the lines of the conveyor bridges are not parallel to the ordinate, then $x_{A1}$ and $x_{A2}$ are different.

The Global Positioning System (GPS) is used to determine the respective position of the conveyor bridge. For this, according to FIG. 1 the means of a fixed base station 18 is provided for the possible measuring field with the associated transformation. Furthermore, two antennas 19 and 20 are provided, of which one is mounted at one end of the conveyor bridge formed by the segments 1 and 5 for receiving the GPS signals. With this unit and the hardware and software needed for this, the position assumed by the conveyor bridge can be determined at any time with sufficient accuracy. So that the segments 1 through 5 move in a straight line as much as possible during the traveling/moving process, the drives of the traveling gears 6 through 11 are controlled synchronously. This takes place with incremental transducers at the engine, gears or the tumbler shaft of the crawler traveling gears 6 through 11. As a result, there is a simultaneous running of all crawlers; all crawler traveling gears 6 through 11 cover the same path.

Figure 5:
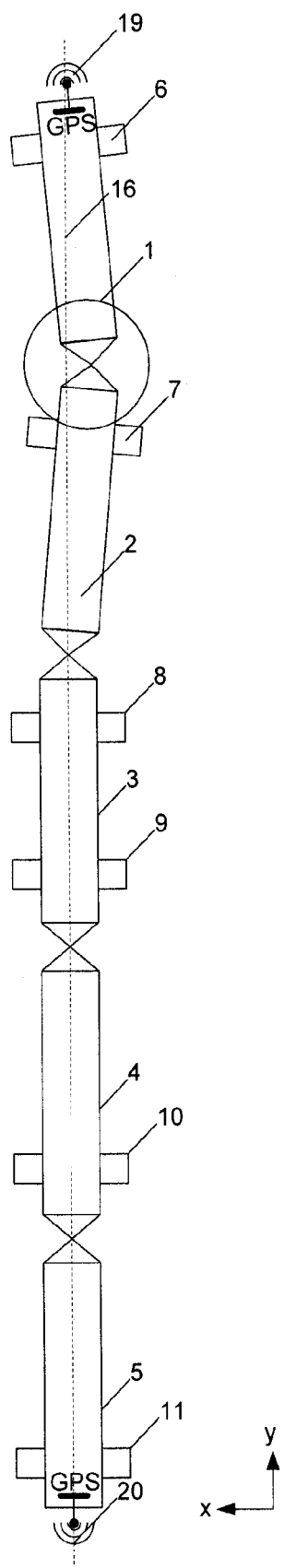
FIG. 5 is the conveyor bridge according to FIG. 1 with a following traveling gear.

A segment 1 through 5 has to cover the shortest path with its traveling gear 6 through 11 on even subsoil. This path is extended when traveling through a hollow or traveling over a hill depending on the profile. The traveling gear 6, 7, 8, 9, 10 or 11 in question remains behind compared to the other traveling gears 6, 7, 8, 9, 10 or 11. Segments 1 through 5 then no longer assume a straight line in the process from starting line 17A to target line 17B. Such a situation, as shown, for example, in FIG. 5 between the segments 1 and 2, is recognized by means of the above-described measuring instrument and corrected by a targeted influence on the traveling gear drives. This correction may be an occasional increase in the travel speed of the traveling gear 7 of segment 2 or an occasional reduction in the travel speeds of the other traveling gears 6, 8, 9, 10 and 11.

The control of this traveling conveyor bridge comprising five segments 1 through 5 takes place automatically by means of a control system according to a certain preset program for the travel in a straight line or travel in a curve according to the coordinates of the path to be covered from the starting line to the target line. The angles for a maximum permissible deviation of two segments 1 through 5 located next to one another are fixed specific to the use. Moreover, the individual speeds for each of the traveling gears 6 through 11 are calculated when traveling in curves (one position is 17C) and sent as commands for the control of the traveling gear drives for the moving process in linear formation.

To resolve special situations or to bring about a special position of segments 1 through 5 of the conveyor bridge, it is possible to switch over from automatic operation to manual operation.

While specific embodiments of the invention have been shown and described in detail to illustrate the application of the principles of the invention, it will be understood that the invention may be embodied otherwise without departing from such principles.

APPENDIX

Reference Numbers Used

1 Segment
2 Segment
3 Segment
4 Segment
5 Segment
6 Traveling gear
7 Traveling gear
8 Traveling gear
9 Traveling gear
10 Traveling gear
11 Traveling gear
12 Measuring instrument misalignment
13 Measuring instrument (example: laser sensor)
14 Reflector/Remote station
15 Protective means for measuring path/rubber sleeve 16 Conveyor bell of the rubber belt conveyor
17A Starting line/previous coordinates
17B Target line/new coordinates
17C A position of the travel in a curve
18 Base station
19 Antenna of the GPS
20 Antenna of the GPS
21 Minimum angle
22 Desired angle (π)
23 Maximum angle
24 Desired distance
25 Maximum distance
26 Minimum distance

What is claimed is:

1. A process for the joint control of a conveyor bridge comprising at least three segments controlled when traveling and moving from a linear starting position, as viewed from the top, into a linear end position, as viewed from the top, wherein each segment is equipped with one, two or a plurality of driven crawler traveling gears, each traveling gear comprising a rotor, and the segments are connected to each other in an articulated manner, the process comprising the steps of:
    a) detecting positions of both ends of the segments, aligned in a starting line, as viewed from the top, of a conveyor bridge before the moving process on terrain;
    b) calculating target coordinates for the control of the conveyor bridge with the intended movement sequence for each traveling gear of the segments of the conveyor bridge as a traveling gear-specific number of pulses corresponding to rotor revolutions;
    c) simultaneously switching on of drives of all traveling gears of the segments of the conveyor bridge;
    d) synchronously controlling the drives of all traveling gears, insofar as a higher-level adjustment by the angle monitoring is not activated;
    e) during the travel movement measuring a distance covered by each traveling gear;
    f) constantly measuring angle deviations from the straight line in a top view between two adjacent segments during travel movement, wherein occasionally with a lagging/excessive speeding over a defined window the traveling speed of a particular one of the crawler traveling gears is increased or reduced or maintained and/or the travel of other crawler traveling gears is slowed down or interrupted;
    g) providing a lateral slope compensation for guaranteeing in each case a vertical position of all segments in relation to the travel level between the traveling gear and the support frame of each segment; and
    h) providing a fine alignment of inner segments of the segments after reaching target coordinates through two outer segments of the segments of the conveyor bridge.

2. A process in accordance with claim 1, wherein the segments of the conveyor bridge can be moved both in a linear path and on a curved path, wherein the drives of the traveling gear are controlled with a same speed reference in case of a linear movement and with a speed reference that is individual to each traveling gear and depends on a curve radius of the curved path of each traveling gear in case of traveling in a curve.

3. A process in accordance with claim 1, wherein the position deviations of the segments in relation to one another, measured from the top view, are angular deviations from a straight line, and these angular deviations are detected as differences in distance between the segments, and when the paths covered of two outer segments are equal, these deviations from one side are added or subtracted one after another, and thus extreme positions are recognizable and the angular deviations are corrected during travel movement.

4. A process in accordance with claim 1, wherein:
    the step of constantly measuring angle deviations includes providing measuring means; and
    differences in distance between two adjacent segments are detected on both sides of an articulated connection distance between two adjacent segments, and for controlling the operation of the measuring means, the measurement results are checked and results of measuring means of adjacent segments are compared to each other, and if a measuring means of one of the adjacent segments fails, another measuring means alone is provided for detection of measured values until repair of the failed measuring means.

5. A device for the joint control of a conveyor bridge comprising at least three segments controlled when traveling and moving from a linear starting position, as viewed from the top, into a linear end position, as viewed from the top, wherein each segment is equipped with one, two or a plurality of driven crawler traveling gears, each traveling gear comprising a rotor, and the segments are connected to each other at a joint connection in an articulated manner, the device comprising:
    a detecting means for detecting positions of both ends of the segments;
    an angle deviation measuring means for measuring angle deviations from the straight line in a top view between two adjacent segments;
    a traveling gear measuring means for measuring a distance covered by each traveling gear; and
    a control system including a central control unit configured to execute a process comprising the steps of:
    detecting, with the detecting means, positions of both ends of the segments, aligned in a starting line, as viewed from the top, of the conveyor bridge before the moving process on terrain;
    calculating target coordinates for the control of the conveyor bridge with the intended movement sequence for each traveling gear of the segments of the conveyor bridge as a traveling gear-specific number of pulses corresponding to rotor revolutions;
    simultaneously switching on of drives of all traveling gears of the segments of the conveyor bridge;
    synchronously controlling the drives of all traveling gears, insofar as a higher-level adjustment by the angle monitoring is not activated;
    during the travel movement measuring a distance covered by each traveling gear with the traveling gear measuring means;
    constantly measuring angle deviations, with the angle deviation measuring means, from the straight line in a top view between two adjacent segments during travel movement, wherein occasionally with a lagging/excessive speeding over a defined window the traveling speed of a particular one of the crawler traveling gears is increased or reduced or maintained and/or the travel of other crawler traveling gears is slowed down or interrupted;
    providing a lateral slope compensation for guaranteeing in each case a vertical position of all segments in relation to the travel level between the traveling gear and the support frame of each segment; and
    providing a fine alignment of inner segments of the segments after reaching target coordinates through two outer segments of the segments of the conveyor bridge.

6. A device in accordance with claim 5, wherein:
the detecting means comprises a Global Positioning System (GPS) for determining the positions of both end points of the conveyor bridge on terrain;
the traveling gear measuring means comprises an incremental transducer measuring a path covered by the traveling gear;
the angle deviation measuring means comprises a goniometer, based on measurement of distance, to determine positions of two adjacent segments and further comprising:
adjusting elements arranged between the traveling gears and the support frames of the segments, whereby a distance between the traveling gears and the support frames is adjusted, wherein:
the central control unit is provided for the analysis of the measured values and the control of the traveling gear drives, the central control unit being fed measured values of the measuring means, measurement results being compared to set values in the control unit, and in case of a deviation of the measurement results over an upper or lower limit, an influence on the drives of the traveling gears of the segments is provided until the desired position of the segments is reached again.

7. A device in accordance with claim 6, wherein a distance measuring instrument is arranged as the goniometer based on distance measurement between two adjacent segments connected to one another in an articulated manner in a certain distance to the articulated connection on the support frame of one segment of the two adjacent segments, and a reflector/remote station is functionally connected to this distance measuring instrument and is arranged on the support frame of the other segment of the two adjacent segments.

8. A device in accordance with claim 5, wherein the angle deviation measuring means comprises two distance measuring devices, each comprising a reflector and a distance meter, located on both sides of the joint connection.

9. A conveyor bridge system comprising:
at least three bridge segments, the segments being each equipped with one, two or a plurality of driven crawler traveling gears, each traveling gear comprising a rotor, and the segments are connected to each other, at a joint connection, in an articulated manner;
a detecting means for detecting positions of both ends of the segments;
an angle deviation measuring means for measuring angle deviations from the straight line in a top view between two adjacent segments;
a traveling gear measuring means for measuring a distance covered by each traveling gear; and
a control system for controlling traveling and moving of the segments from a linear starting position, as viewed from the top, into a linear end position, as viewed from the top, the control system including a central control unit configured to execute a process comprising the steps of:
detecting, with the detecting means, positions of both ends of the segments, aligned in a starting line, as viewed from the top, of the conveyor bridge before the moving process on terrain;
calculating target coordinates for the control of the conveyor bridge with the intended movement sequence for each traveling gear of the segments of the conveyor bridge as a traveling gear-specific number of pulses corresponding to rotor revolutions;
simultaneously switching on of drives of all traveling gears of the segments of the conveyor bridge;
synchronously controlling the drives of all traveling gears, insofar as a higher-level adjustment by the angle monitoring is not activated;
during the travel movement measuring a distance covered by each traveling gear with the traveling gear measuring means;
constantly measuring angle deviations, with the angle deviation measuring means, from the straight line in a top view between two adjacent segments during travel movement, wherein occasionally with a lagging/excessive speeding over a defined window the traveling speed of a particular one of the crawler traveling gears is increased or reduced or maintained and/or the travel of other crawler traveling gears is slowed down or interrupted;
providing a lateral slope compensation for guaranteeing in each case a vertical position of all segments in relation to the travel level between the traveling gear and the support frame of each segment; and
providing a fine alignment of inner segments of the segments after reaching target coordinates through two outer segments of the segments of the conveyor bridge.

10. A conveyor bridge system in accordance with claim 9, wherein:
the detecting means comprises a Global Positioning System (GPS) for determining the positions of both end points of the conveyor bridge on terrain;
the traveling gear measuring means comprises an incremental transducer measuring a path covered by the traveling gear;
the angle deviation measuring means comprises a goniometer, based on measurement of distance, to determine positions of two adjacent segments and further comprising:
adjusting elements arranged between the traveling gears and the support frames of the segments, whereby a distance between the traveling gears and the support frames is adjusted, wherein:
the central control unit is provided for the analysis of the measured values and the control of the traveling gear drives, the central control unit being fed measured values of the measuring means, measurement results being compared to set values in the control unit, and in case of a deviation of the measurement results over an upper or lower limit, an influence on the drives of the traveling gears of the segments is provided until the desired position of the segments is reached again.

11. A conveyor bridge system in accordance with claim 10, wherein a distance measuring instrument is arranged as the goniometer based on distance measurement between two adjacent segments connected to one another in an articulated manner in a certain distance to the articulated connection on the support frame of one segment of the two adjacent segments, and a reflector/remote station is functionally connected to this distance measuring instrument and is arranged on the support frame of the other segment of the two adjacent segments.

12. A conveyor bridge system in accordance with claim 10, wherein the angle deviation measuring means comprises two distance measuring devices, each comprising a reflector and a distance meter, located on both sides of the joint connection.

* * * * *